July 1, 1941.                    H. DE KOEVEND                    2,247,942
                              TELEMETRIC ANNUNCIATOR
                              Filed June 20, 1938

INVENTOR
Herman DeKoevend
BY
ATTORNEY

Patented July 1, 1941

2,247,942

UNITED STATES PATENT OFFICE 2,247,942

TELEMETRIC ANNUNCIATOR

Herman De Koevend, South Platte, Colo.

Application June 20, 1938, Serial No. 214,749

4 Claims. (Cl. 177—380)

This invention relates to means and apparatus operable to report variable natural or physical phenomena, and has as an object to provide an improved annunciator unit adapted for operative association with telemetric signaling systems to automatically and accurately report a variable physical factor or characteristic determinable by a given installation and arrangement of apparatus.

A further object of the invention is to provide an improved telemetric annunciator unit operable in association with automatic signaling means to accurately and automatically report a physical factor or characteristic, such as the level of liquid in a lake, reservoir, stream, or the like.

A further object of the invention is to provide an improved telemetric annunciator arranged to actuate signaling means in a manner to accurately and automatically report factors or characteristics of variable physical phenomena wherewith the signaling means is directly associated for variable positioning longitudinally of the annunciator element.

A further object of the invention is to provide an improved telemetric annunciator arranged to report through suitable signaling means factors and characteristics of variable physical phenomena in readily distinguishable units and uniform fractions of units.

A further object of the invention is to provide an improved telemetric annunciator which is simple and inexpensive of construction, installation, and operation; which is positive, efficient, and accurate in use; which is susceptible of convenient operative association with various specific telemetric signaling systems; which is adaptable to the reporting of determinative factors and characteristics of various physical phenomena; and which is particularly suitable for operative association with fully automatic telemetric systems.

My invention consists in the construction, arrangement, and combination of elements hereinafter set forth, pointed out in my claims, and illustrated by the accompanying drawing, in which—

Figure 2:
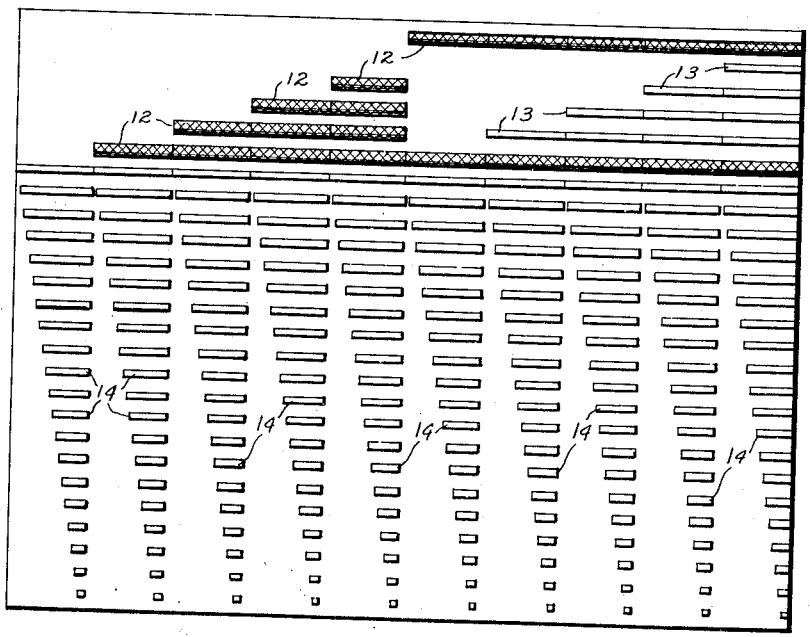
Figure 3:
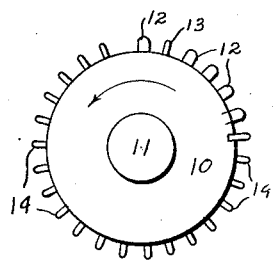
Figure 1:
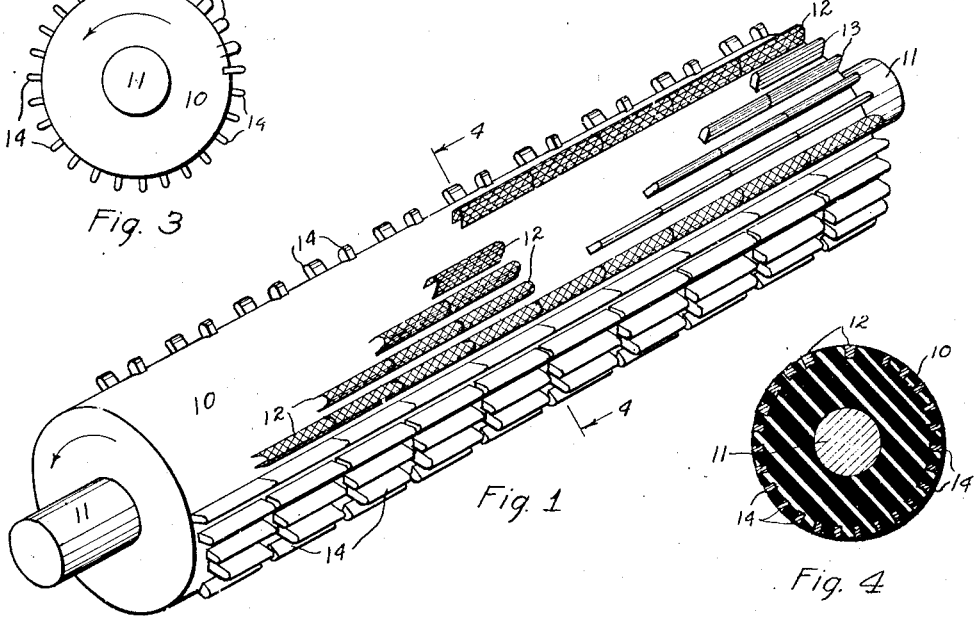
Figure 4:
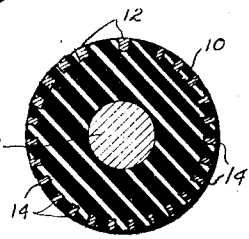

Figure 1 is an isometric view of an annunciator assembly embodying the principles of my invention and particularly arranged to report variations in liquid level through telemetric signaling means positionable longitudinally of the annunciator by and in a direct proportional relation with such liquid level. Figure 2 is a diagrammatic development of the operating surface and signal-actuating elements shown in Figure 1. Figure 3 is an end elevation of the assembly shown in Figure 1. Figure 4 is a cross section of a modified embodiment of the invention taken through the modified construction on a plane corresponding to the position of the indicated line 4—4 of Figure 1.

The improved annunciator is a unitary assembly arranged to be mounted for rotation in axially-fixed relation with driving means and other elements of telemetric signaling systems and apparatus, and is arranged for rotative engagement of its peripheral elements with and for actuation of a signal-transmitting device, such as a reproducer, switch, key, or the like, which is mounted to slide longitudinally along and adjacent the annunciator assembly for positioning longitudinally of said assembly in some positively-connected, direct proportion with the factor or characteristic of the physical phenomenon to be reported.

The annunciator assembly comprises a body portion in the form of an axially-elongated, cylindrical drum 10 fixed to and in axial coincidence with a suitable shaft or shaft elements 11 projecting beyond end portions of the drum 10 for engagement in suitable bearings or journals, whereby the assembly may be mounted for rotation by power means suitably engaging said shaft. The cylindrical surface of the drum 10 is uniformly divided axially of the drum to provide a series of annular bands of uniform width, in this instance ten in number, completely covering the cylindrical drum surface and each representing one unit of the system whereby the factor or characteristic to be determined is measured. For example, when the annunciator is employed in determining a variable liquid level, each of the annular bands may well represent a foot of liquid depth, in which case the signal-transmitting element associated with the annunciator would be arranged to traverse the width of one band on the drum 10 for each variation of one foot in the liquid depth.

In the embodiment of the invention illustrated in Figures 1, 2, and 3, each of the annular bands constituting the cylindrical surfaces of the drum 10 supports an arrangement of radially-projecting means disposed for engagement with and actuation of the signal-transmitting means during rotation of the annunciator assembly, which radially-projecting means are so grouped on a given annular band as to actuate the signal-transmitting means in accordance with a predetermined code readable in units and fractions of units of the factor or characteristic to be determined, successive bands having differing distinctive groupings of the actuating elements for the purpose of immediately and readily identifying the particular band wherewith the signal-transmitting is in engagement. Each of the annular bands is divided circumferentially of the drum into two zones or portions which occupy the same relative position on the drum for each of said bands and are hence aligned longitudinally of the drum surface, one of said zones having a relatively less extent circumferentially of the drum and being utilized through rotation of the drum to specifically designate the relative unit value of each successive annular band in ascending order as the signal-transmitting element is caused to move longitudinally of and from the left-hand to the right-hand end of the annunciator unit, while the other and circumferentially greater zone is utilized to indicate through continued drum rotation the fractional unit value represented by the position of the signal-transmitting element longitudinally of a given annular band. To positively indicate the unit value of a given annular band or code group, actuating elements engageable with a signal-transmitting element are variously grouped and arranged in the narrower or band-identifying zone of the drum surface. Various specific groupings of actuating elements may, of course, be employed to indicate the relative unit value of a given band or code group, the arrangement of such elements illustrated being but typical and in no sense limitative, though particularly desirable because of its simple, logical, and consecutive nature. In the arrangement shown, the direction of drum rotation being as indicated by the arrows and the unit values being arranged in ascending order from left to right longitudinally of the drum 10, the code group or band of minimum value is arranged to leave an unobstructed space entirely across the zone of unit designation so that no actuation of the signal-transmitting element is had for unit designation and such lack of unit designation is interpreted as giving the first band a unit value of zero. The second annular band is provided with means arranged to actuate the signal-transmitting element once in a distinctive or readily-recognizable manner during that portion of the cylinder rotation which serves to pass the unit-designating zone under or in engagement with said signal-transmitting element, the arrangement shown providing a single longitudinal bar or actuating element 12 disposed longitudinally and in radial-projecting relation with the drum 10 in traversing relation across the width of said second annular band and closely adjacent the trailing margin of the unit-designating zone. The actuating element 12 may be of such specific form and construction as may be best adapted for the desired distinctive actuation of the signal-transmitting element, the construction illustrated in the drawing comprising a circumferentially relatively wide rib of metallic mesh material disposed to present a relatively wide crown or outer surface engageable with and for distinctive actuation of the signal-transmitting element when the latter is brought into engagement with said element 12 during rotation of the drum. With the arrangement shown, the signal readable from the unit-designating zone of the second band is a single, distinctive actuation occurring after a pause or blank having a duration slightly less than that readable from the corresponding zone of the first annular band, which signal naturally and logically represents a unit value of one. The third, fourth, and fifth annular bands each carry a signal-actuating element 12 aligned longitudinally of the drum with the corresponding element of the second band, and, in addition, are respectively provided with one, two and three additional elements 12 disposed in parallel relation with and spaced circumferentially and forwardly in the direction of drum rotation from those elements 12 of each band aligned with the corresponding elements of the second band, so that the third annular band presents two elements 12 in circumferentially-spaced, parallel relation, the fourth band is provided with three elements 12 in circumferentially-spaced, parallel relation, and the fifth band is provided with four such elements 12. The arrangement shown and described provides for a unit-designating signal from the third band which consists of a pause followed by a double signal of distinctive character, readily readable as a unit value of two; the fourth band is productive of a triple distinctive signal following a relatively shorter pause, which is conveniently and naturally readable as representing a unit value of three; while the fifth band actuates the signal-transmitting element four times for production of a distinctive signal in closely-repeated sequence after a relatively still shorter pause for a unit designation having a value of four.

The arrangement of band-identifying, signal-transmitter-actuating elements in the unit-designating zone of the sixth, seventh, eighth, ninth, and tenth annular bands has a characteristic common to all said bands in that an element 12 is provided in traversing relation with each of said bands in alignment longitudinally of the drum with the single such unit of the second annular band and with the trailing such units carried by the third, fourth, and fifth bands, said aligned units 12 being thus disposed adjacent the trailing side of the unit-designating zone, and, in addition, a row of units 12 is aligned longitudinally of the drum in traversing relation with the sixth, seventh, eighth, ninth, and tenth bands adjacent the leading side of the unit-designating zone and in spaced, parallel relation forwardly in the direction of drum rotation with the line of such units adjacent the trailing side of said zone, so that as said drum is rotated relative to the signal-transmitting element, the actuating elements of the bands constituting the right-hand half of the annunciator unit cause the distinctive signal of the element 12 to be transmitted from the leading margin of the unit-designating zone and to be repeated after a space from the trailing portion of said zone. This double, distinctive signal interrupted by a relatively long space is characteristic of and serves to readily identify the sixth band without other specific indication, said signal being readable as six. To identify the seventh, eighth, ninth, and tenth bands, actuating elements 13 productive of a signal characteristically different from that produced by the elements 12 and represented in this instance as circumferentially-narrow, solid bars projecting radially from the drum a distance corresponding with the radial projection of the elements 12, are disposed in the unit-designating zone of each band intermediate the elements 12 of such band and in an arrangement productive of a characteristic signal for each such band, the arrangement shown providing for one such element 13 in spaced, parallel proximity with the trailing element 12 of the seventh band, so that the signal transmitted as a unit designation for said band is the same as the signal for the sixth band with the addition of one signal characteristic of the elements 13, and is hence distinguishable to be read as a unit designation seven, while the eighth, ninth, and tenth bands have, respectively, two, three, and four of the elements 13 in spaced, parallel relation between their elements 12 for the actuation of the signal-transmitting element to produce signal or code groups readily readable as eight, nine, and ten. Other groupings and arrangements of the actuating elements 12 and 13, or of equivalent elements, may be had for cooperation with a signal-transmitting element in the production of code groups variously and specifically identifying the relative position or numerical order of the annular bands longitudinally of the drum 10, the specific arrangement shown and above described being convenient, practical, susceptible of ready interpretation in a logical sequence, but in no sense limitative. It should be readily apparent that the arrangement of actuating elements in the unit-designating zone of the annunciator assembly is productive through rotation of said assembly past and in engagement with a signal-transmitting element of a signal code group which positively and immediately identifies the relative position of the signal-transmitting element longitudinally of the annunciator assembly and hence indicates directly the unit value or measure of the factor or characteristic which controls the relative position of the signal-transmitting element, and which is to be determined.

In trailing relation with the unit-designating zone of the annunciator, each of the annular bands is provided with an identical grouping of actuating elements operable to designate fractional values of the factor or characteristic to be determined. In the arrangement shown, each of the annular bands carries a plurality, in this instance twenty, of actuating elements 14 similar to the ribs or bars 13, which elements 14 of each band are uniformly spaced circumferentially of the drum 10, project uniformly radially from said drum, and are progressively shorter in proportion to their numerically remote relation with the unit-designating zone of the corresponding band. The first of the elements 14 in trailing relation with the unit-designating zone of its respective band extends entirely across its band area, the second such element 14 in the band is spaced circumferentially of the drum from and in parallel trailing relation with the first of said elements, has its right-hand end aligned circumferentially of the drum with the corresponding end of the first element 14, and has a length one-twentieth shorter than the length of the first said element 14, thus spacing its left-hand end inwardly out of alignment with the corresponding end of said shaft element, which arrangement is continued around the band, preserving the circumferential alignment of the right-hand ends of the elements 14 in a given band. With the arrangement shown and described, the signal designating the unit value of any given band or group is followed by a series of identical, uniformly-spaced signals resulting from engagement of the elements 14 with the signal-transmitting element, until the progressive shortening of the elements 14 prevents engagement of the remaining such elements in a given band with the signal-transmitting element, whereafter no further signals are had until the annunciator assembly has rotated to again bring the unit-designating zone thereof into engagement with the signal-transmitting element for repetition of the group signal. Knowing the number and spacing of the elements 14, the number of signals produced in a given code group by said elements may be immediately read as so many fractions of a unit, in this instance so many twentieths of a unit, the relative position of the signal-transmitting element longitudinally of the annunciator assembly determining the number of progressively-shorter elements 14 engageable therewith, and hence indicating accurately the unit and fractional unit value of the factor or characteristic controlling the relative position of the signal-transmitting element. It is obvious that the number, spacing, and relative length of the elements 14 in a given band or code group may be varied to read in such fractions of a unit as may be expedient or desirable in the application of the annunciator assembly to the determination of specific factors or characteristics.

The alternative construction of the annunciator assembly illustrated in Figure 4 is in all functional and operative respects identical with the construction hereabove described, the showing of Figure 4 indicating an arrangement wherein the actuating elements 12, 13, and 14 are embedded in a cylinder 10 of dielectric material with the outer margins of said elements disposed flush with the cylindrical surface of the drum and hence positioned for successive engagement during drum rotation with a signal-transmitting element which rides continuously on the surface of said drum. This latter arrangement is particularly adapted for use when the desired signal results from closing of an electrical circuit, in which event the actuating elements are included in an electrical circuit closable through engagement of said elements with the signal-transmitter.

In the operation of the improved annunciator, the assembly, constructed and arranged substantially as shown and described, is mounted for rotation in driven relation with any suitable power means and adjacent a signal-transmitting element disposed to slide longitudinally of the annunciator and positionable along the annunciator in some direct, positively-connected relation with the variable factor or characteristic to be determined. Irrespective of the position of the signal-transmitting element along the annunciator, rotation of the latter actuates the signal-transmitting element by engagement therewith of the actuating elements 12, 13 and 14, to produce a code group signal definitely designating the position of the signal-transmitting element relative to the annunciator assembly and hence readily readable in terms measuring the factor or characteristic to be determined. The annunciator may be operatively associated with apparatus constituting a signaling system arranged for continuous operation, or with apparatus automatically operable upon call from a remote control station, as may be deemed expedient or desirable in a given instance, such systems being well known and in themselves forming no part of the instant invention.

Since many changes, modifications, and variations in the specific form, construction and relation of the elements shown and described may be had without departing from the spirit of my invention, I wish to be understood as being limited solely by the scope of the appended claims, rather than by any details of the illustrative showing and foregoing description.

I claim as my invention:

1. A telemetric annunciator comprising an elongated cylinder rotatable about its axis, a plurality of annular bands having each a width corresponding to a unit of the factor or characteristic to be determined defined in marginally-coincident succession on the surface of said cylinder, a unit-designating zone common to all of said bands longitudinally of said cylinder, actuating elements productive of characteristic signals distinctively arranged in circumferentially-spaced relation in the unit-designating zone of each band to identify the relative position of the bands longitudinally of the cylinder, and additional actuating elements productive of signals distinct in character from those designating the unit zone identically arranged in progressively shorter, circumferentially-spaced relation on each band and in trailing relation with the unit-designating zone of the band to indicate unit fractions.

2. In a telemetric annunciation, an elongated cylinder rotatable about its axis, groups of circumferentially-spaced actuating elements productive of characteristic signals aligned in a common zone longitudinally of said cylinder to define annular zones in marginally-coincident succession thereon, the actuating elements of each group being distinctively arranged to identify the relative position of its annular zone longitudinally of the cylinder, and additional actuating elements productive of signals distinct in character from those of said first groups identically grouped in progressively shorter, circumferentially-spaced relation on each of said annular zones and in trailing relation with the corresponding group of zone-designating elements to indicate unit fractions.

3. In a telemetric annunciator, an elongated cylinder rotatable about its axis, groups of relatively-thick, circumferentially-spaced actuating elements productive of characteristic signals aligned in a common zone longitudinally of said cylinder to define unit-designating, annular zones in marginally-coincident succession thereon, the actuating elements of each group being distinctively arranged to identify the relative position of its annular zone longitudinally of the cylinder, and relatively-thin actuating elements productive of signals distinct in character from those of said thicker elements identically grouped in progressively shorter, circumferentially-spaced relation on each of said annular zones and in trailing relation with the corresponding group of zone-designating elements to indicate unit fractions.

4. In a telemetric annunciator, an elongated cylinder rotatable about its axis, groups of relatively-thick, mesh-surfaced, circumferentially-spaced actuating elements productive of characteristic signals aligned in a common zone longitudinally of said cylinder to define unit-designating, annular zones in marginally-coincident succession thereon, the actuating elements of each group being distinctively arranged to identify the relative position of its annular zone longitudinally of the cylinder, and relatively-thin, bar-type actuating elements productive of signals distinct in character from those of said mesh-surfaced elements identically grouped in progressively shorter, circumferentially-spaced relation on each of said annular zones and in trailing relation with the corresponding group of zone-designating elements to indicate unit fractions.

HERMAN DE KOEVEND.